Jan. 3, 1950     M. SIMCICH     2,493,366
HUBCAP
Filed Jan. 2, 1947
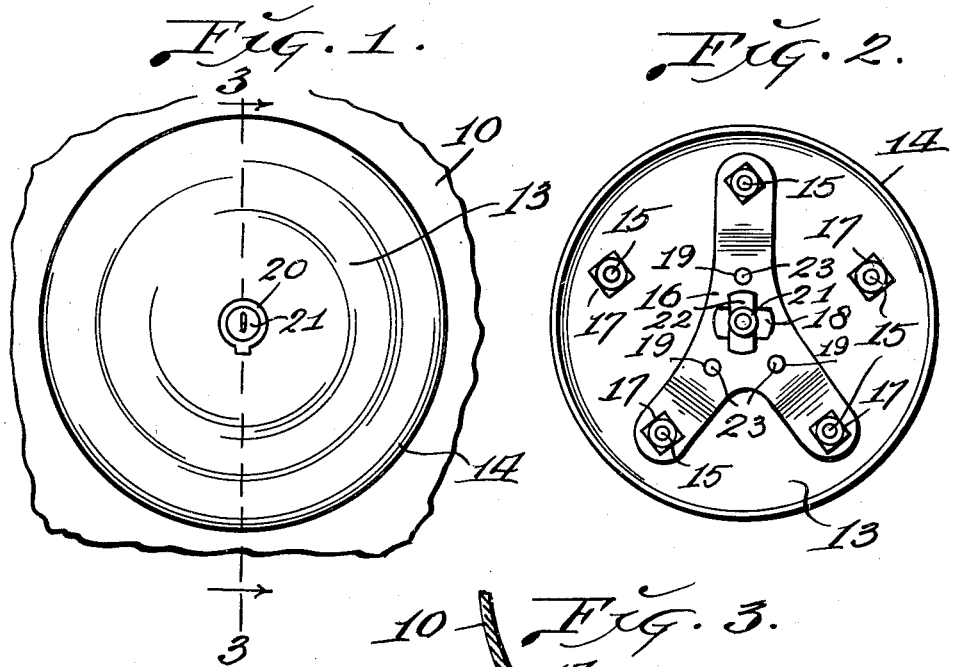
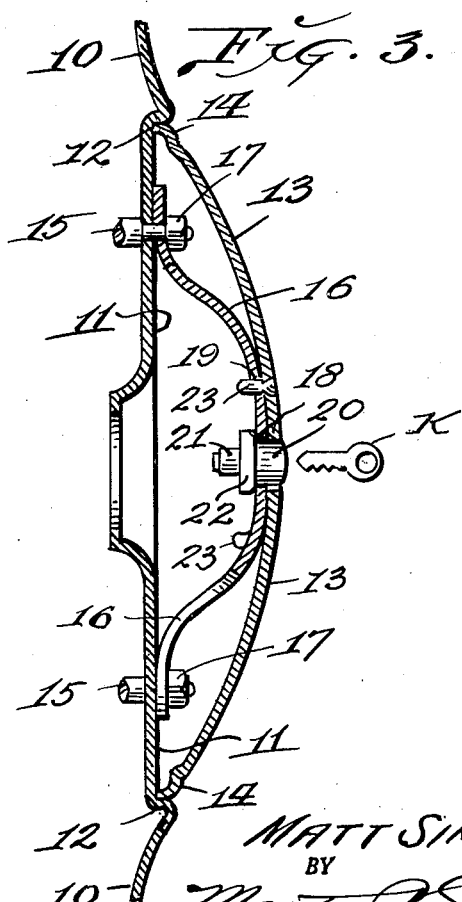
INVENTOR.
MATT SIMCICH.
BY
Martin P. Smith,
ATTY.

Patented Jan. 3, 1950

2,493,366

UNITED STATES PATENT OFFICE 2,493,366

HUBCAP

Matt Simcich, Los Angeles, Calif.

Application January 2, 1947, Serial No. 719,876

1 Claim. (Cl. 301—108)

My invention relates to hub caps of the particular type used on vehicle wheels having pneumatic tires, and the principal objects of my invention are, to provide a hub cap having simple, inexpensive and highly efficient means for detachably mounting same on the outer disc of the wheel body between the hub and rim and to provide said hub cap with means for locking in to the wheel body, thus effectively preventing accidental loss or theft of the cap from the wheel.

With the foregoing and other objects in view, my invention consists in certain novel features of construction and arrangement of parts which will be hereinafter more fully described and claimed and illustrated in the accompanying drawings in which:

Fig. 1 is an elevational view of my improved hub cap in position on the outer disc of the wheel body.

Fig. 2 is an elevational view looking against the inner face of the hub cap.

Fig. 3 is an enlarged vertical section taken on the line 3—3 of Fig. 1.

Referring by numerals to the accompanying drawings which illustrate a preferred embodiment of my invention, 10 designates the outer disc-shaped wall of a conventional motor vehicle wheel, the central portions of its outer face being formed with a shallow circular recess 11, bounded by a shoulder 12.

In accordance with my invention, the hub cap consists of a concave-convex disc-shaped body 13 provided with a marginal bead 14 adapted to fit snugly in recess 11 against shoulder 12.

Conventional disc wheels used on motor vehicles employ a plurality of bolts 15, generally five in number, for mounting the outer disc 10 and in accordance with my invention, the ends of three of these bolts which project through said disc provide supports and points of attachment for the ends of a three armed bracket 16, the ends of the arms being perforated for the reception of the outer ends of said three bolts.

Nuts 17 screw seated on the outer ends of the bolts, anchor the ends of the arms of bracket 16 thereto.

Formed in the center of bracket 16 is a slot or non-circular aperture 18 and formed in the inner end portions of the arms of the bracket are apertures 19.

Secured in the center of hub cap 13 is the housing 20 of a small conventional combination lock having tumblers actuated by a key such as K and the rotating cylinder 21 of said lock carries on its inner end, a cross bar 22, which, when the hub cap is applied to the wheel, passes through aperture 18 and when turned by key manipulation approximately 90 degrees, lies across said aperture, against the inner face of bracket 16 and thereby locks the hub cap thereto.

In order to correctly position cap 13 on bracket 16, and hold said cap against rotation, studs 23 project inwardly from the cap and enter the apertures 19 in said bracket.

The outer end of lock housing 20 lies approximately flush with the convex outer face of cap 13 and thus there is little, if any danger of the lock being damaged or rendered inoperative as a result of accidental contact with parts of other cars or extraneous objects.

When the hub cap is locked to the wheel, it cannot become loose, or disconnected and therefore lost and theft of said cap is practically impossible.

Thus it will be seen that I have provided a vehicle wheel hub cap that is simple in structure, inexpensive of manufacture, capable of being easily and quickly applied to or removed from the wheel hub and which is very effective in performing the functions for which it is intended.

Minor changes in the size, form and construction of the various parts of my improved hub cap may be made and substituted for those herein shown and described without departing from the spirit of the invention, the scope of which is set forth in the appended claim.

I claim as my invention:

The combination with a vehicle wheel outer disc and its mounting bolts, of a substantially Y-shaped bracket bowed lengthwise, with the ends of the arms of said bracket mounted on the ends of said disc mounting bolts, there being a non-circular aperture formed in the center of said bracket and there being apertures formed in the arms of said bracket adjacent the central aperture therein, a dished hub cap adapted to be positioned over said bracket with its edge bearing on said outer disc and its central inner face bearing directly against the central outer face of said bracket, a lock secured to and projecting inwardly from the center of said hub cap and having a non-circular locking bolt adapted to pass through the non-circular aperture in said bracket, and studs seated in and projecting inwardly from said hub cap for engagement in the apertures in the arms of said bracket.

MATT SIMCICH.

REFERENCES CITED

The following references are of record in the file of this patent:

UNITED STATES PATENTS

| Number | Name | Date |
|---|---|---|
| 2,106,586 | Zerk | Jan. 25, 1938 |
| 2,145,565 | Yankovitch | Jan. 31, 1939 |
| 2,249,568 | Shinliver | July 15, 1941 |
| 2,329,945 | Schatzman | Sept. 21, 1943 |
| 2,334,828 | Mallory | Nov. 23, 1943 |

FOREIGN PATENTS

| Number | Country | Date |
|---|---|---|
| 290,098 | Great Britain | 1930 |
| 268,524 | Italy | 1929 |
| 279,319 | Italy | 1930 |